US005102751A

United States Patent [19]

Narang et al.

[11] Patent Number: 5,102,751

[45] Date of Patent: Apr. 7, 1992

[54] PLASTICIZERS USEFUL FOR ENHANCING IONIC CONDUCTIVITY OF SOLID POLYMER ELECTROLYTES

[75] Inventors: Subhash C. Narang, Redwood City; Sivapackia Ganapathiappan, Mountain View, both of Calif.

[73] Assignee: SRI International, Menlo Park, Calif.

[21] Appl. No.: 562,195

[22] Filed: Aug. 3, 1990

Related U.S. Application Data

[63] Continuation-in-part of Ser. No. 476,270, Feb. 7, 1990, Pat. No. 5,061,581.

[51] Int. Cl.[5] .......... H01M 10/40

[52] U.S. Cl. .......... 429/192; 252/62.2

[58] Field of Search .......... 429/192; 252/62.2

[56] References Cited

U.S. PATENT DOCUMENTS

| | | | |
|---|---|---|---|
| 4,303,748 | 12/1981 | Armand et al. | 429/192 |
| 4,357,401 | 11/1982 | Andre et al. | 429/192 |
| 4,556,614 | 12/1985 | Cemehaute et al. | 429/191 |
| 4,578,326 | 3/1986 | Armand et al. | 429/192 |
| 4,683,181 | 7/1987 | Armand et al. | 429/192 |
| 4,728,588 | 3/1988 | Noding et al. | 429/192 X |
| 4,822,701 | 4/1989 | Ballard et al. | 252/62.2 X |

OTHER PUBLICATIONS

Goshuma et al. *Chemical Abstracts*, vol. 107, No. 189077X, 1987.

Muja et al., *Chemical Abstracts*, vol. 96, No. 19683D, 1982.

Alcorn et al., *Chemical Abstracts*, vol. 72, No. 48053R.

M. B. Armand et al., "Poly-Ethers as Solid Electrolytes", in *Fast Ion Transport in Solids: Electrodes and Electrolytes*, Ed. P. Vashishta et al. 1979.

M. B. Armand, "Current State of PEO-Based Electrolytes" in Polymer Electrolyte Reviews, Eds. MacCallum and Vincent P. M. Blonsky et al., *J. Am. Chem. Soc.* 106: 6854 (1984).

K. Chen et al., *Chemistry of Materials* 1:483-484 (1984).

S. Ganapathiappan et al., *Macromolecules 21:2299-2301 (1988).*

S. Ganapathiappan et al., *J. Amer. Chem. Soc. 111:4091-4095 (1989).*

M. Gauthier et al., *J. Electrochem. Soc.: Electrochemical Science and Technology,* 132:1333 (Jun. 1985).

J.-F. Le NEst et al., *Polymer Communication* 28:302-305 (1987).

T. Miyanishi et al., *Macromolecules 17:975-977 (1984).*

J. M. Parker et al., *Polymer* 14:589 (1973).

E. A. Rietman et al., *J. Polymer Sci.: Part C-Polymer LEtters* 28:187-191 (1990).

D. F. Schriber et al., *Solid State Ionics* 5:83-88 (1981).

D. F. Shriber et al., "Solid Ionic Conductors", in *Chemical & Engineering News,* May 20, 1985.

E. Tsuchida et al., *Macromoleculse* 8896-100 (1988).

P. V. Wright, *Br. Polymer J.* 7:319 (1975).

B,-b Zhou et al., Polymer Communications 30:52-55 (1989).

*Primary Examiner*—Stephen Kalafut

*Attorney, Agent, or Firm*—Morrison & Foerster

[57] ABSTRACT

A plasticizer useful for enhancing the ionic conductivity of a solid polymer electrolyte, comprising a compound of the formula: $R_3C(OC_2R_4)_nCN$ wherein each R constituent is independently hydrogen, alkyl, aryl. alkenyl, or aralkyl and a plasticized solid polymer electrolyte including such a plasticizer.

11 Claims, 3 Drawing Sheets

9

12

10

8

6

7

PLASTICIZERS USEFUL FOR ENHANCING IONIC CONDUCTIVITY OF SOLID POLYMER ELECTROLYTES

CROSS-REFERENCE

This application is a continuation-in-part of copending application Ser. No. 476,270, filed Feb. 7, 1990, now U.S. Pat. No. 5,061,581.

TECHNICAL FIELD

The present invention relates to plasticizers useful for enhancing ionic conductivity of solid polymer electrolytes and to solid polymer electrolytes which had been enhanced through the incorporation of such plasticizers.

BACKGROUND OF THE INVENTION

A number of solvent-free polymer electrolytes are known and there has been considerable interest in the possible utilization of the electrolytes in electrochemical devices such as batteries, fuel cells, supercapacitors, electrochromic devices and sensors. Among the polymers which have been tested for such use are those based upon the linear-chain polyethers, poly(ethyleneoxide) and poly(propyleneoxide), with alkali metal salts. Phosphazene and siloxane comb polymers have also been reported which exhibit better conductivity at room temperature than do the linear-chain polyether electrolytes. One class of polymers of interest are the polyphosphazene sulfonates as reported by S. Ganapathiappan, Kaimin Chen and D. F. Shriver, Macromolecules, 1988, 21, 2299, in Journal of the American Chemical Society, 1989, 111, 4091 and Chemistry of Materials, 1989, 1, 483. Polyether electrolytes are reported in, for example, Polymer Communications, 1987, 28, 302. Polyester conductive polymers are reported in, for example, Macromolecules 1988, 21, 96. Cation conductive siloxane comb polymers are reported in Polymer Communications, 1989, 30, 52 and in Journal of Polymer Science: Part C: Polymer letters, 22, 187-191, 1990. Anionic conductivity is also known in solid polymer electrolytes as is reported, for example, in Macromolecules 1984, 17, 975.

While the various polymer electrolytes set forth in the above publications have shown promise, such promise has generally not been enough to make them practical choices for use in, applications wherein it is desirable to have particularly high ionic conductivity for the polymer electrolyte and wherein it is desirable to use relatively thin films of the polymer electrolyte. Basically, the polymer electrolytes of the prior art do not exhibit sufficient ionic conductivity. Furthermore, the polymer electrolytes of the prior art have generally not exhibited desirable physical properties for incorporation in electrolytic devices. For example, the films may be too sticky, the polymers may be too close to being liquid, the polymers may be too brittle, or the polymers may be too heat sensitive.

A number of plasticizers have been found to be useful for enhancing the ionic conductivity of solid polymer electrolytes. However, the plasticizers of the prior art often suffer from various drawbacks. For example, some of them are too volatile and will escape the polymer electrolyte over a period of time whereby the conductivity will decrease and the properties of the polymer will likewise change, for example the polymer might become more brittle and/or might peel from a substrate on which it has been coated. Plasticizers which would provide the desired plasticizing effect, would not be readily volatilized away from the polymer, which will not deleteriously alter the mechanical properties of the polymer and which would significantly enhance the ionic conductivity of the solid polymer electrolyte would therefore be desirable.

The present invention is directed to overcoming one or more of the problems as set forth above.

DISCLOSURE OF INVENTION

In accordance with an embodiment of the present invention a plasticizer is set forth which is useful for enhancing the ionic conductivity of a solid polymer electrolyte. The plasticizer comprises a compound of the formula $R_3C(OC_2R_4)_nCN$ wherein each R constituent is independently hydrogen, alkyl, aryl alkenyl, or aralkyl and wherein n=2 to 8 inclusive.

In accordance with another embodiment of the present invention an amorphous ionically conductive macromolecular solid is set forth having improved ambient temperature ionic conductivity. The solid can be 1) one which carries a negative charge and has a positively charged ionic species associated with it, 2) one which carries a positive charge and has a negatively charged ionic species associated with it or 3) one which comprises a solid solution having ionic species dissolved in it. It also includes an effective amount for enhancing the ionic conductivity of the solid of a plasticizer of the formula $R_3C(OC_2R_4)_nCN$ wherein each R constituent is independently hydrogen, alkyl, aryl alkenyl, or aralkyl and wherein n=1 to 8 inclusive.

The present invention provides a properly plasticized macromolecular solid which significantly enhances the ionic conductivity of the solid and is not readily lost through vaporization. Indeed, through selection of the size of the plasticizer, i.e., by selection of the value n, one can control the volatility of the plasticizer to be whatever is desired for a particular use temperature for the macromolecular solid.

BRIEF DESCRIPTION OF DRAWINGS

The invention will be better understood by reference to the figures of the drawings wherein like partes denote like parts throughout and wherein.

BEST MODE FOR CARRYING OUT INVENTION

Figure 1:
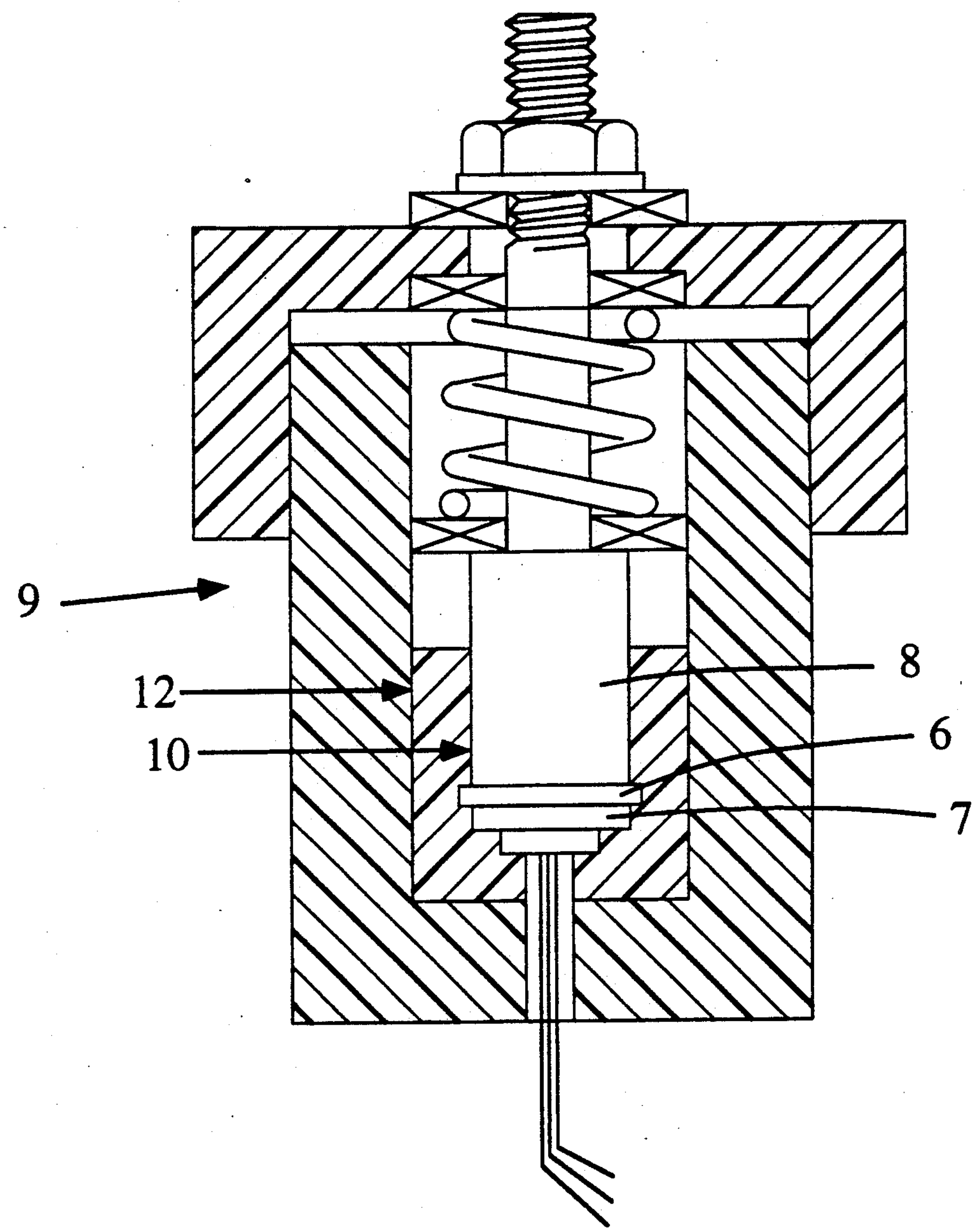
FIG. 1 illustrates a cell assembly as used for measuring conductivity.

In accordance with an embodiment of the present invention a plasticizer is set forth which is useful for enhancing ionic conductivity of a solid polymer electrolyte. The plasticizer has the formula $R_3C(OC_2R_4)_nCN$ wherein each R constituent is independently hydrogen, alkyl, aryl alkenyl, or aralkyl and wherein n=2 to 8 inclusive. Such compounds can be formed, for example, by the following reaction scheme:

$$CH_3(OC_2H_4)_mOH + Na \xrightarrow[THF]{} NaO(C_2H_4O)_mCH_3$$

-continued

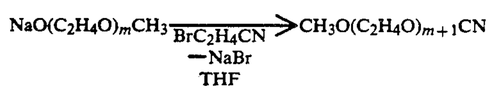

where m is an integer or average of integers and is equal to one less than n.

Plasticizers of the above formula serve the usual plasticizer function of adjusting the mechanical properties of the polymers system. Additionally, they significantly increase the conductivity of a wide range of polymer electrolytes. The types of solid polymer electrolytes which can have their conductivity increased, often by as much as three orders of magnitude, include 1) those which carry a negative charge and have a positively charged ionic species associated with them, 2) those which carry a positive charge and have a negatively charged ionic species associated with them and 3) those which comprise solid solutions having ionic species dissolved in them.

Examples of solid polymer electrolyte systems which carry a negative charge and have a positively charged ionic species associated with them and with which the use of the plasticizers disclosed herein provides increased conductivity include those having the formula $$-X-Y^{-}M^{+}$$

wherein $X=CF_2$, CFCN, CFR, or CCNR or $C_6F_aR_b$ where a is 1–4, b is 0–3 and a+b is 4 and where R is virtually any organic or substituted organic group, for example, alkyl, alkenyl, aryl, aralkyl, haloalkyl, CN, a polymer such as a polyether, a polyester, a polyamine, a polyimine, etc.

$Y=SO_3$, $CO_2$ or $PO_c$ where c is 2, 3 or 4, and

M=a cation. Such polymers are described in concurrently filed application Ser. No. 562,738 which is incorporated herein by reference.

The term cation is used broadly herein to include virtually every species which can bear a positive charge and includes the elements of Groups IA, IB, IIA, IIB, IIIA, IIIB, IVA, IVB, VA, VB, VIA, VIB, VIIA, VIIB, AND VIII of the Periodic Table of the Elements.

Examples of useful polymer backbones include polyether polymers, polyester polymers, poly(ethylene)imine polymers, polyphosphazene polymers, siloxane polymers, and the like. The just set forth list of polymer backbones is not meant to be exhaustive but is merely illustrative of a few of the polymers to which the side chains $-X-Y^{-}M^{+}$ may be appended. The polymers which make up the backbone of the macromolecular solid can be polymerized by the methods of the prior art. The polymer backbone may also comprise a copolymer of two or more polymers with repeating units of the individual monomers.

Generally the number of side chains on the macromolecular solid should be such as to provide from 0.04 to about 4 side chains per monomer unit. More preferably, the number of side chains per monomer unit falls within the range from about 0.04 to about 2.

The preferred compounds are those wherein

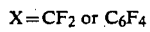

Alternatively, some, but not all of the fluorines may be replaced with an organic group. Virtually any organic or substituted organic group can be present, for example, alkyl, alkenyl, aryl, aralkyl, haloalkyl, a polymer such as a polyether, a polyester, a polyamine, a polyimine, etc.

The cation, M, can be virtually any desired cation for a desired use, e.g., as a sensor, battery, fuel cell, supercapacitor, electrochromic device, or the like.

Generally, the compound

```
R2C—X
 |   |
 O—Y,
```

where X, Y and R are as previously defined, can be reacted with virtually any polymer which has an available hydrogen, for example a hydrogen attached to nitrogen, sulfur or oxygen, to provide the desired side chains. As pointed out previously, the group R can be virtually any alkyl, aryl, aralkyl, alkenyl, fluoroalkyl, fluoroaryl or fluoroalkenyl group or can be an oligomer such polyethyleneoxide or polypropyleneoxide.

An alternative side chain can be added by reacting the compound

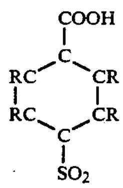

with an active hydrogen on a polymer backbone. Such might be carried out, for example, by converting the above compound to its acid chloride and then reacting the acid chloride with poly(ethyleneimine).

Examples of solid polymer electrolyte systems which comprise solid solutions having ionic species dissolved in them and with which the use of the plasticizers disclosed herein provides increased conductivity include those having the formula $$-(X-C(R_1)_2C(R_1)_2-Y-C(R_1)_2C(R_1)_2)_n-$$

wherein:

X and Y are the same or different and are each independently O, S or NR with at least about 10% of all X and Y being O; and each $R_1$ is the same or different and is independently H or a $C_{1-4}$ saturated or unsaturated hydrocarbon radical optionally substituted with halide.

Typical macromolecular materials of this formula may have, for example, any of the structures set forth in the following Table 1.

TABLE 1

STRUCTURES OF SOLID POLYMER ELECTROLYTES

| Polymer Unit | S/O % |
|---|---|
| (1) $(-SCH_2CH_2SCH_2CH_2SCH_2CH_2OCH_2CH_2-)_n$ | 75 |
| (2) $(-SCH_2CH_2SCH_2CH_2SCH_2CH_2OCH_2CH_2OCH_2CH_2-)_n$ | 60 |

TABLE 1-continued

| STRUCTURES OF SOLID POLYMER ELECTROLYTES | |
|---|---|
| Polymer Unit | S/O % |
| (3) $(-SCH_2CH_2OCH_2CH_2-)_n$ | 50 |
| (4) $(-SCH_2CH_2SCH_2CH_2OCH_2CH_2OCH_2CH_2-)_n$ | 50 |
| (5) $(-SCH_2CH_2SCH_2CH_2OCH_2CH_2OCH_2CH_2OCH_2CH_2-)_n$ | 40 |
| (6) $(-SCH_2CH_2OCH_2CH_2OCH_2CH_2-)_n$ | 33.33 |
| (7) $(-SCH_2CH_2OCH_2CH_2OCH_2CH_2OCH_2CH_2OCH_2CH_2-)_n$ | 20 |
| (8) $(-S-(CH_2CH_2O)_6-CH_2CH_2-)_n$ | 14 |
| (9) $(-S-(CH_2CH_2O)_9-CH_2CH_2-)_n$ | 10 |
| (10) $((-CH_2CH_2SCH_2CH_2O-)_{.7}(-CH_2CH_2SCH_2CHO-)_{.3})_n$ with $CH_3$ on CH | 50 |
| (11) $(-CH_2NCH_2-)_n$ with D on N, where D is $-CH_2OCH_2CH_3$ | |
| (12) $(-CH_2NCH_2-)_n$ with D' on N, where D' is $-CH_2CH_2OCH_2CH_3$ | |
| (13) $(-CH_2NCH_2-)_n$ with E on N, where E is $-CH_2CH_2SCH_2OCH_2CH_2OCH_3$ | |

The listed sulfur containing macromolecular materials have the mole percents sulfur shown in the right-hand column with such percents sulfur representing the percent of the oxygen which has been replaced by sulfur.

Structures 11-13 show compounds wherein all of the oxygens have been replaced with a group NR and wherein the R group is significantly different in each instance. In the instance of structures 11 and 12 an ether linkage exists in the R group whereby association to a cation is possible In the structure labelled 13 a thioether linkage is present in addition to two ether linkages. It should be noted that the above structures are not meant to be exhaustive of the possibilities in this respect but are, instead, only meant to be illustrative of a few of such macromolecular materials. More generally, the group "R" can have from 2 to 10 carbon atoms and may contain substantially any electronegative site which is capable of associating with the cation. And, macromolecular materials are useful wherein some of the oxygens are replaced by sulfurs and others by NR groups. Still further, it should be recognized that copolymers may be made with ethylene oxide, propylene oxide, and the like, if desired, and that such will still fall within the formula so long as they have the replacement S and/or NR substituents. Such polymers, their preparation and their use as solid polymer electrolytes is described in copending application Ser. No. 476,270, filed Feb. 7, 1990, which is incorporated herein by reference.

The molecular weight of the macromolecular material of such polymers will generally fall within a range from about 10,000 to about 3,000,000, and will preferably fall within a range from about 100,000 to about 1,000,000.

In the above formula X and Y are the same or different and are each independently O,S or NR wherein R includes at least one ether or thioether linkage or group —PO, —$PO_2$, —$PO_3$, —SbO, —SO, —$SO_2$, —$NR''_2$ or —AsO, which serves as a basic site capable of associating with the cation. Generally, each R will include 2 to 10 carbon atoms. It may also include other atoms such as oxygen, sulfur, phosphorus, arsenic, antimony, nitrogen and hydrogen Generally, at least about 25% of all X and Y are O. Generally no more than about 98% of all X and Y are O. Each R″ may independently be hydrogen or alkyl, alkenyl or aryl with 1 to 10 carbon atoms.

Each $R_1$ is the same or different and is independently hydrogen or a $C_{1-4}$ saturated or unsaturated hydrocarbon radical optionally substituted with triallylsilyl, oxygen, sulfur or phosphate.

The amorphous ionically conductive macromolecular solid of the above formula can be formulated as using conventional polymerization techniques. The (thio-oxyethylenes) are synthesized by two methods. In one method, thio-oxyethylene dithiols are reacted with equimolar amounts of thio-oxyethylene dichloride. This method provided polymers with molecular weights not exceeding 10,000 daltons. In the second method, the reaction of thio-oxyethylene dithiols with N,N'-diisopropyl-O-ethyleneglycol bisisoureas, gives polymers with higher weight average molecular weights.

With respect to the ionic compound such may comprise , for example, any of the following: LiCl, NaCl, KCl, $LiCF_3SO_3$, $LiClO_4$, $LiAsF_6$, $LiPF_6$, $LiBF_4$, LiBr, LiI, LiSCN, Li00CR′, where R′ may be alkyl, alkenyl, alkynyl or aromatic and includes 1 to 10 carbon atoms. Preferably, the cation is sodium or lithium.

The invention will be better understood by reference to the following experimental examples.

Equipment And Measurement Technique

Figure 2:
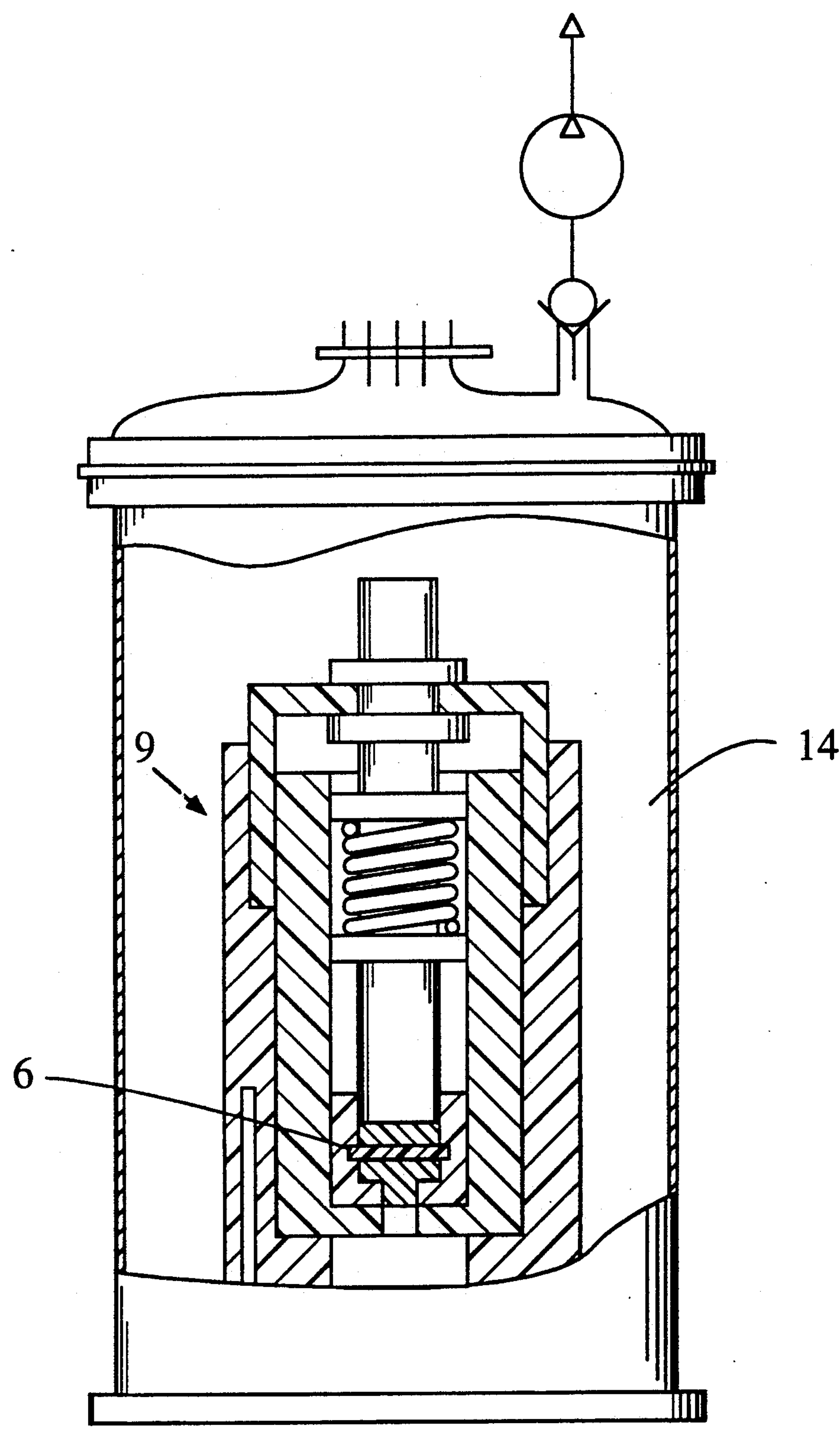
FIG. 2 illustrates a cell and vacuum chamber as used for measuring conductivities.

Conductivities of the polymers were evaluated by AC impedance spectroscopy. Referring to the Figures, a film 6 of the dried polymer electrolyte was sandwiched between two stainless steel blocking electrodes 7,8 that each had an area of 0.7854 $cm^2$. The thickness of the polymer film 6, which typically varied between 0.51 mm and 1.02 mm, was measured with a micrometer. The assembly 9, composed of the blocking electrode-polymer sandwich cell 10 inside a Delrin cup 12 (FIG. 1), was transferred to a vacuum chamber 14 that had provision for heating (FIG. 2) and for applying a constant pressure of 65–97 lb/in² across the polymer film 6. The electrodes 7,8 were connected to a potentiostat (PAR 173) operating in the galvanostatic mode.

Figure 3:
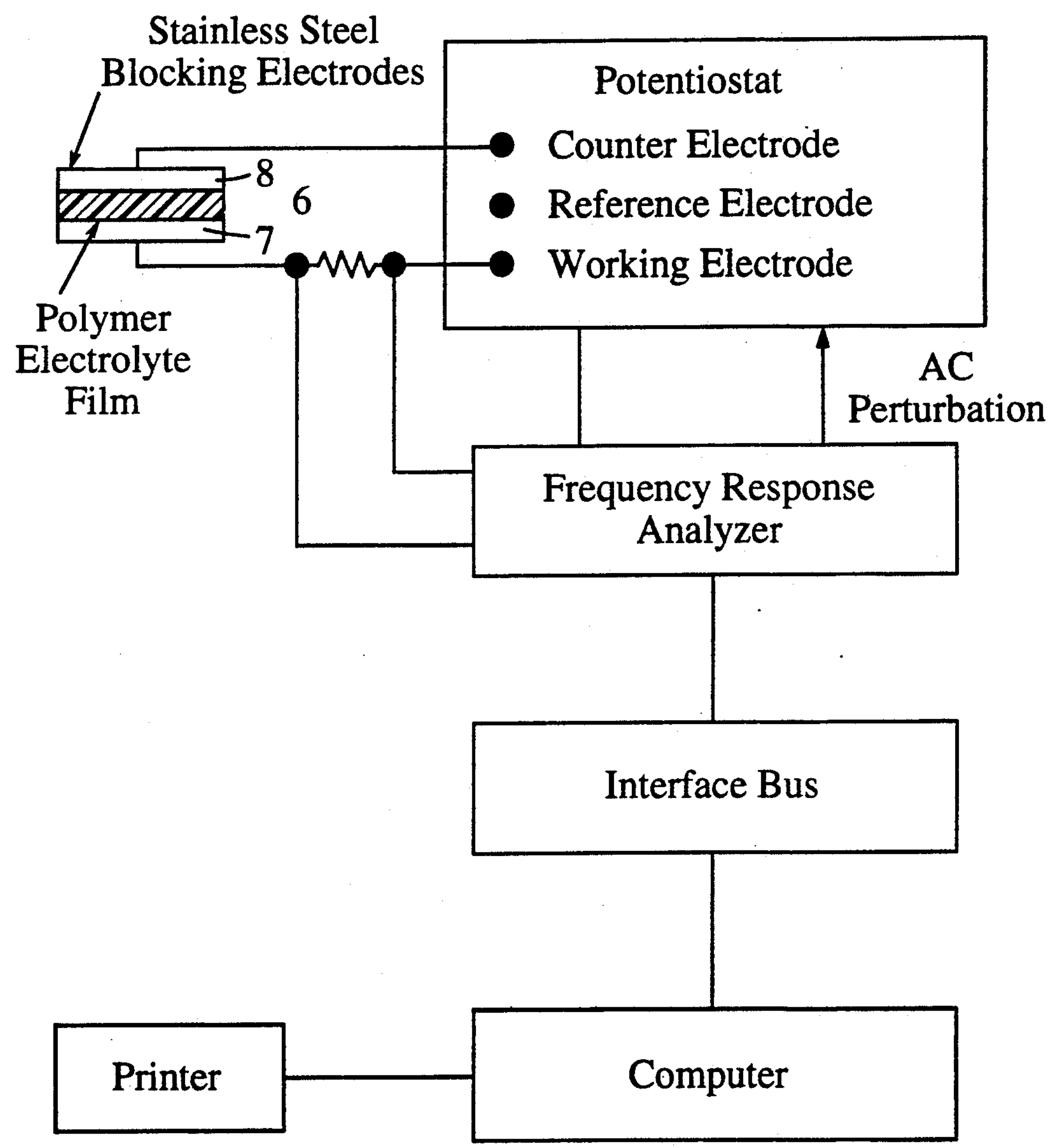
FIG. 3 illustrates, schematically, an experimental setup as used for AC impedance (conductivity) measurements.

The cell 10 was then perturbed with a small AC signal generated by a Solartron 1250 Frequency Response Analyzer, and the real and imaginary components of the cell impedance were measured as a function of frequency at each of the desired temperatures. The setup was allowed to stabilize overnight after the temperature was changed. The AC impedance data were plotted in both the Nyquist and Bode planes to identify the high frequency relaxation arising due to the polymer electrolyte. Typically, the frequency of the AC signal was scanned from 65 KHz down to 10 mHz. The intercept at the real axis of the high frequency relaxation was assumed to represent the resistive component of the polymer electrolyte impedance. This was then converted to the resistivity of the polymer (the thickness and the area of the polymer film 6 were known). The reciprocal of resistivity gave the conductivity, $\sigma$, having units of $\Omega\text{-cm}^{-1}$. In cases where high frequency relaxation occurred above 65 KHz, a Hewlett Packard 4192A Impedance Analyzer was used to measure the polymer electrolyte resistance. This instrument has a frequency range capability of 13 MHz to 5 Hz. The experimental setup 16 used for conductivity measurements is shown in FIG. 3.

Preparation Of Polymer/Lithium Films

Solutions of polymer/Li films were prepared by dissolving a known quantity of a Lithium salt, e.g., lithium triflate, and polymer in dry solvent. The weights used were such that the polymer salt complex had 8 or 16 ether oxygen and sulfur atoms to one $Li^+$ ion. The mixture was then allowed to stand overnight.

For conductivity measurements, the polymer/Li solution was added dropwise into the Delrin cup to cast a film. The film was then dried for 3 days in a glass vacuum apparatus at 120° C. at <0.01 torr. Film thickness was measured using a micrometer.

EXAMPLE 1

This example demonstrates the effect of adding plasticizer in accordance with the present invention to ionically conductive macromolecular solids having the formula

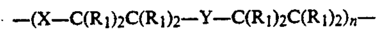

$$—(X—C(R_1)_2C(R_1)_2—Y—C(R_1)_2C(R_1)_2)_n—$$

wherein:

X and Y are the same or different and are each independently O, S or NR with at least about 10% of all X and Y being O; and each $R_1$ is the same or different and is independently H or a $C_{1-4}$ saturated or unsaturated hydrocarbon radical optionally substituted with halide.

Table 2 demonstrates the conductivity of polymers of the above set out formula, more specifically of polymers having the structure shown in the Table 2, and the effect of an added plasticizer of the invention.

TABLE 2

Effect of the Plasticizer $CH_3(OC_2H_4)_4CN$ on the Conductivity of: $[OCH_2CH\{CH_2S(C_2H_4O)_{7.23}CH_3\}(LiCF_3SO_3)_{0.577}]_n$

| Amount of Plasticizer per 100 mg of polymer salt complex (mg) | $\sigma$ at 25° C. $(\Omega\text{-cm})^{-1}$ |
|---|---|
| 0 | $6.7 \times 10^{-6}$ |
| 34 | $1.6 \times 10^{-5}$ |
| 67 | $3.2 \times 10^{-5}$ |
| 114 | $5.3 \times 10^{-5}$ |
| 160 | $7.0 \times 10^{-5}$ |
| 183 | $7.4 \times 10^{-5}$ |
| 300 | $4.7 \times 10^{-5}$ |

EXAMPLE 2

This example demonstrates the effectiveness of plasticizers in accordance with the present invention in improving the ionic conductivity of polymers having a poly(ethyleneimine) backbone having side chains having distal constituents having the formula $$—X—Y^-M^+$$

wherein

X=$CF_2$, CFCN, CFR, or CCNR or $C_6F_aR_b$ where a is 1–4, b is 0–3 and a+b is 4 and where R is virtually any organic or substituted organic group, for example, alkyl, alkenyl, aryl, aralkyl, haloalkyl, CN, a polymer such as a polyether, a polyester, a polyamine, a polyimine, etc.

Y=$SO_3$, $CO_2$ or $PO_c$ where c is 2, 3 or 4, and

M=a cation.

Table 3, which follows, shows the beneficial effect on conductivity, upon polymers containing differing amounts of $Li^+$ ions, more specifically polymers having the structures shown in Table 3, of a plasticizer in accordance with the present invention which has the formula $CH_3(OC_2H_4)_4CN$.

TABLE 3

| Amount of Plasticizer (mole) | Ratio of Ether Oxygen to $Li^+$ Ion | Conductivity at Room Temp. $(\text{ohm-cm})^{-1}$ |
|---|---|---|
| 0 | 16.0 | below $10^{-7}$ |
| 2.69 | 47.6 | $2.2 \times 10^{-6}$ |
| 2.88 | 49.9 | $2.3 \times 10^{-6}$ |
| 3.36 | 55.5 | $3.8 \times 10^{-6}$ |
| 4.76 | 74.3 | $5.9 \times 10^{-6}$ |

The above results demonstrate the effectiveness of a plasticizer in accordance with the present invention in increasing conductivity over a wide range of concentrations of plasticizer and of cation concentration. The polymers exhibited good mechanical properties in that they were not sticky or brittle and could be deposited in thin films.

EXAMPLE 3

This example illustrates the effectiveness of plasticizers of the present invention in improving the ionic conductivity of polymers having a polyphosphazene backbone and having side chains of the formula set forth in Example 3. Table 4 summarizes the results of conductivity testing of such polymers.

TABLE 4

| Ionic Conductivity of Polyphosphazene Based Polyelectrolytes $[NP(OC_2H_4OC_2H_4OCH_3)_{1.8}(OCH_2CF_2SO_3^-Li^+)_{0.2}]_n$ (100 mg) | |
|---|---|
| Amount of Plasticizer (mg) | Conductivity at 24° C. $(\Omega\text{-cm})^{-1}$ |
| 0 | $3.2 \times 10^{-7}$ |
| 66 | $3.4 \times 10^{-6}$ |
| 132 | $4.3 \times 10^{-5}$ |
| 321 | $1.8 \times 10^{-5}$ |
| 516 | $1.4 \times 10^{-5}$ |

Plasticizer used was $CH_3(OC_2H_4)_4CN$

EXAMPLE 4

This example demonstrates the effectiveness of plasticizers in accordance with the present invention wherein utilized with polymers having siloxane backbones and having side chains in accordance with those set forth in Example 3. Table 5 summarizes the conductivity data for such polymers.

TABLE 5

$$[(\underset{\substack{|\\OR}}{\overset{\substack{CH_3\\|}}{Si}}O)_{0.89}(\underset{\substack{|\\OC_2H_4OCOF_2SO_3^-Li^+}}{\overset{\substack{CH_3\\|}}{Si}}O)_{0.11}]_n;\ R = CH_3(OC_2H_4)_3$$

| Amount of Plasticizer (mg) | Conductivity at 24° C. $(\Omega\text{-cm})^{-1}$ |
|---|---|
| 0 | $1.1 \times 10^{-6}$ |
| 57 | $1.9 \times 10^{-5}$ |
| 99 | $3.2 \times 10^{-5}$ |
| 196 | $4.5 \times 10^{-5}$ |
| 390 | $1.2 \times 10^{-5}$ |

Plasticizer used was $CH_3(OC_2H_4)_4CN$

EXAMPLE 5

This example demonstrates the effectiveness of plasticizers in accordance with the present invention with additional conductive solid polymer electrolytes having the general formula as set forth in Example 1 with the particular formulas as set forth in Tables 6 and 7 which summarize the conductivity data for such polymers.

TABLE 6

| Effect of the Plasticizer $CH_3(OC_2H_4)_2CN$ on the Conductivity of: $[(C_2H_4S)(C_2H_4O)_5(LiCF_3SO_3)_{0.375}]_n$ | |
|---|---|
| Amount of Plasticizer per 100 mg of polymer salt complex (mg) | σ at 25° C. $(\Omega\text{-cm})^{-1}$ |
| 37.8 | $3.1 \times 10^{-5}$ |
| 48.7 | $9.4 \times 10^{-5}$ |
| 107.3 | $1.7 \times 10^{-4}$ |
| 135.8 | $2.1 \times 10^{-4}$ |
| 184.0 | $2.1 \times 10^{-4}$ |
| 233.9 | $3.8 \times 10^{-4}$ |
| 288.8 | $1.1 \times 10^{-4}$ |
| 536.1 | $4.4 \times 10^{-5}$ |

TABLE 7

| Effect of the Plasticizer $CH_3(OC_2H_4)_4CN$ on the Conductivity of: $[C_2H_4N\{(C_2H_4O)_{8.23}CH_3\}(LiCF_3SO_3)_{0.514}]_n$ | |
|---|---|
| Amount of Plasticizer per 100 mg of polymer salt complex (mg) | σ at 25° C. $(\Omega\text{-cm})^{-1}$ |
| 40.6 | $1.1 \times 10^{-5}$ |
| 42.0 | $1.8 \times 10^{-5}$ |
| 74.0 | $1.7 \times 10^{-5}$ |
| 110.0 | $3.3 \times 10^{-5}$ |
| 160.0 | $8.7 \times 10^{-5}$ |

Industrial Applicability

Plasticizers in accordance with the present invention provide amorphous ionically conductive macromolecular solids of improved ionic conductivity, which macromolecular solids can be utilized as electrolytes in batteries, fuel cells, sensors and the like.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An amorphous ionically conductive macromolecular solid having improved ambient temperature ionic conductivity comprising a solid solution of at least one positively charged ionic species dissolved in a macromolecular material, and an effective amount for enhancing the ionic conductivity of said solid of a plasticizer comprising a compound of the formula:

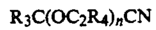

$$R_3C(OC_2R_4)_nCN$$

wherein each R constituent is independently hydrogen, alkyl, aryl alkenyl, or aralkyl and wherein n=2 to 8 inclusive.

2. A macromolecular solid as set forth in claim 3, wherein n=2, 3 or 4.

3. A macromolecular solid as set forth in claim 1, wherein said macromolecular material comprising a polymer or copolymer having a polyether structure and having at least a portion of the ether oxygen thereof replaced with S or NR wherein R includes at least one basic site capable of associating with said positively charged ionic species and has 2 to 10 carbon atoms.

4. A macromolecular solid as set forth in claim 3, wherein said macromolecular material has the formula:

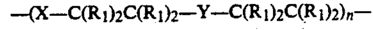

$$—(X—C(R_1)_2C(R_1)_2—Y—C(R_1)_2C(R_1)_2)_n—$$

wherein:

X and Y are the same or different and are each independently O, S or NR with at least about 10% of all X and Y being O; and each $R_1$ is the same or different and is independently H or a $C_{1-4}$ saturated or unsaturated hydrocarbon radical optionally substituted with halide.

5. A macromolecular solid as set forth in claim 4, wherein said basic site comprises an ether or thioether linkage or a group —PO, —$PO_2$, —$PO_3$, —SbO, —SO, —$SO_2$, —AsO or —$NR''_2$ where each R" is independently hydrogen or alkyl, alkenyl or aryl having 1 to 10 carbon atoms.

6. A macromolecular solid as set forth in claim 4, wherein no more than about 95% of all X and Y are oxygen.

7. A macromolecular solid as set forth in claim 3, wherein said ionic species is sodium, lithium or potassium.

8. A macromolecular solid as set forth in claim 1, wherein said macromolecular material comprises a polymer or copolymer having a plurality of side chains having distal constituents having the formula:

$-X-Y^{-}M^{+}$ wherein $X=CF_2$, CFCN, CFR, or CCNR or $C_6F_aR_b$ where a is 1–4, b is 0–3 and a+b is 4 and where R is an organic or substituted organic group, $Y=SO_3$, $CO_2$ or $PO_c$ where c is 2, 3 or 4, and M=a cation.

9. A macromolecular solid as set forth in claim 8, wherein n=2, 3 or 4.

10. A macromolecular solid as set forth in claim 8, wherein said polymer or copolymer has a phosphazene, polyethylene imine or siloxane backbone.

11. A macromolecular solid as set forth in claim 10, wherein n=2, 3 or 4.

* * * * *